US011985536B2

(12) United States Patent
Zhao et al.

(10) Patent No.: US 11,985,536 B2
(45) Date of Patent: May 14, 2024

(54) UE-DRIVEN PACKET FLOW DESCRIPTION MANAGEMENT

(71) Applicant: Apple Inc., Cupertino, CA (US)

(72) Inventors: Yingjie Zhao, Pleasanton, CA (US); Longda Xing, San Jose, CA (US); Rangakrishna Nallandigal, Santa Clara, CA (US); Jason Ke, Cupertino, CA (US)

(73) Assignee: Apple Inc., Cupertino, CA (US)

( * ) Notice: Subject to any disclaimer, the term of this patent is extended or adjusted under 35 U.S.C. 154(b) by 26 days.

(21) Appl. No.: 17/484,964

(22) Filed: Sep. 24, 2021

(65) Prior Publication Data

US 2023/0096727 A1 Mar. 30, 2023

(51) Int. Cl.
*H04W 28/02* (2009.01)

(52) U.S. Cl.
CPC ....... *H04W 28/0268* (2013.01); *H04W 28/02* (2013.01)

(58) Field of Classification Search
None
See application file for complete search history.

(56) References Cited

U.S. PATENT DOCUMENTS

| 2010/0135221 | A1* | 6/2010 | Komura | H04L 1/1607 455/450 |
| 2013/0083783 | A1* | 4/2013 | Gupta | H04W 88/16 370/338 |
| 2018/0324633 | A1* | 11/2018 | Lee | H04W 8/04 |
| 2019/0029057 | A1* | 1/2019 | Pan | H04W 76/10 |
| 2019/0089843 | A1* | 3/2019 | Zhou | H04W 40/28 |
| 2019/0141571 | A1* | 5/2019 | Kim | H04L 69/04 |
| 2020/0145876 | A1* | 5/2020 | Dao | H04W 28/06 |
| 2020/0329008 | A1* | 10/2020 | Dao | H04L 61/4511 |
| 2020/0336321 | A1* | 10/2020 | Ding | H04L 12/1407 |
| 2021/0075868 | A1* | 3/2021 | Hu | H04L 67/141 |

(Continued)

FOREIGN PATENT DOCUMENTS

| EP | 3528532 A1 | 8/2019 |
| EP | 3755117 A1 | 12/2020 |
| WO | WO2022012764 | * 1/2022 |

OTHER PUBLICATIONS

3GPP TS 23.682 V17.0.0. 3rd Generation Partnership Project; Technical Specification Group Services and System Aspects; Architecture enhancements to facilitate communications with packet data networks and applications (Release 17) (Jun. 2021) (Year: 2021).*

(Continued)

*Primary Examiner* — Andre Tacdiran
(74) *Attorney, Agent, or Firm* — Eschweiler & Potashnik, LLC

(57) ABSTRACT

In some aspects, the present disclosure relates to a method for performing packet flow description (PFD) management, the method including establishing a Quality-of-Service (QoS) flow between a user equipment (UE) and a core network (CN) for a data flow of an application, creating, by the UE, a UE-requested packet flow description (PFD) upon a change in the data flow, sending, from the UE to the CN, a request to the CN for updating a CN PFD to an updated PFD using the UE-requested PFD, receiving, at the UE from the CN, a downlink (DL) packet mapped to the QoS flow using the updated PFD.

15 Claims, 7 Drawing Sheets

(56) References Cited

U.S. PATENT DOCUMENTS

2022/0191146 A1* 6/2022 Cañete Martinez .................... H04L 47/2475
2022/0287115 A1* 9/2022 Hu ..................... H04W 28/0268

OTHER PUBLICATIONS

3GPP TS 23.682 V16.9.0 (Mar. 2021). 3rd Generation Partnership Project; Technical Specification Group Services and System Aspects; Architecture enhancements to facilitate communications with packet data networks and applications (Release 16). (Year: 2021).*
Network Working Group; "Definition of the Differentiated Services Field (DS Field) in the IPV4 and IPv6 Headers"; Dec. 1998.
Internet Engineering Task Force (IETF); "Diameter Base Protocol" Oct. 2012.
Technical Specification; "5G; System Architecture for the 5G System"; (3GPP TS 23.501 version 15.3.0 Release 15); ETSI TS 123 501 V15.3.0; Sep. 2018.
Technical Specification; "5G; Policy and charging control framework for the 5G System (5GS)"; Stage 2; (3GPP TS 23.503 version 16.6.0 Release 16); ETSI TS 123 503 V16.6.0; Oct. 2020.
Technical Specification; 5G; Non-Access Stratum (NAS) protocpol for 5G System (5GS); Stage 3; (3GPP TS 24.501; version 15.6.0 Release 15); ETSI TS 124 501 V15.6.0; Jan. 2020.
Technical Specification; 5G; 5G System; "Network Exposure Function Northbound APIs"; Stage 3; (3GPP TS 29.522 version 16.4.0 Release 16); ETSI TS 129 522 V16.4.0; Aug. 2020.
Technical Specification; "LTE; 5G; Evolved Universal Terrestrial Radio Access (E-UTRA) and NR; Service Data Adaptation Protocol (SDAP) specification" (3GPP TS 37.324 version 16.2.0 Release 16); ETSI TS 137 324 V16.2.0; Nov. 2020.
European Extended Search Report dated Feb. 14, 2023 in connection with European Application Serial No. 22193083.

* cited by examiner

UE-DRIVEN PACKET FLOW DESCRIPTION MANAGEMENT

FIELD

This invention relates to wireless data transmission technology and to Quality of Service (QoS).

BACKGROUND

Quality of Service (QoS) is a mechanism to control network traffic by priority. Using QoS in networking can optimize performance of certain applications by allocating bandwidth, latency, bit rate, delay to achieve the expected service quality. When a network provides a QoS for an application, and the application creates a data flow, a protocol data unit (PDU) session sets up a QoS flow and maps the data flow to the QoS flow. QoS flows provide priority information to different applications, users, or data communications. Upon a change in the data flow by the application, the UE and the network correspondingly update the mapping of the data flow to the QoS flow to continue the QoS for the application. To update this mapping, packet flow description (PFD) management may be utilized.

DETAILED DESCRIPTION

Figure 1:
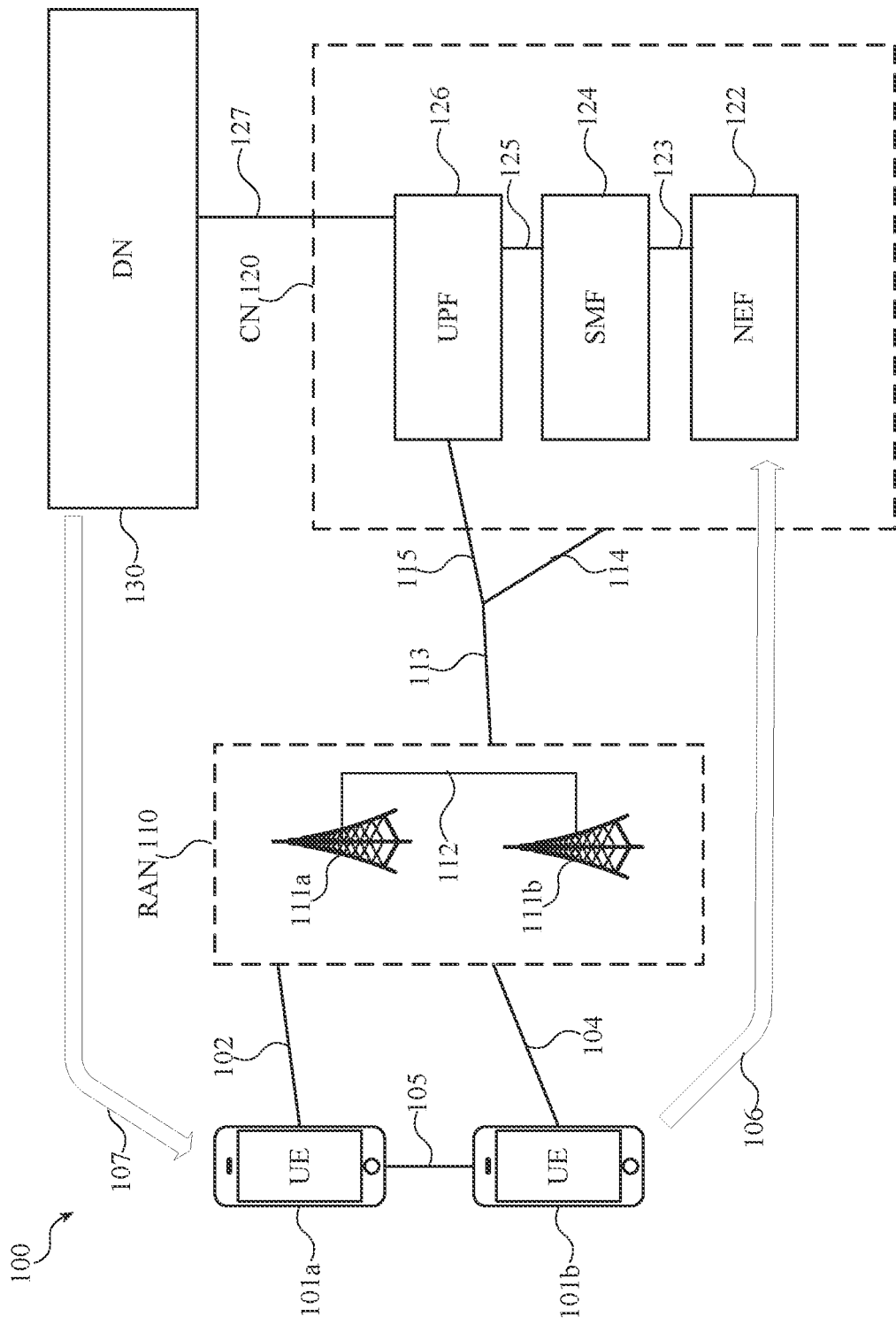
FIG. 1 illustrates a block diagram illustrating an architecture of a wireless system including a user equipment (UE) and a core network (CN) in accordance with some aspects.

The present disclosure is described with reference to the attached figures. The like reference numerals are used to refer to like elements throughout. The figures are not drawn to scale, and they are provided merely to illustrate the disclosure. Several aspects of the disclosure are described below with reference to example applications for illustration. Numerous specific details, relationships, and methods are set forth to provide an understanding of the disclosure. The present disclosure is not limited by the illustrated ordering of acts or events, as some acts may occur in different orders and/or concurrently with other acts or events. Furthermore, not all illustrated acts or events are required to implement a methodology in accordance with the selected present disclosure.

A packet flow description (PFD) describes the packet flow for uplink or downlink application traffic by parameters such as protocol, IP, and port number. A PFD management enables the network to perform accurate application detection for updating QoS flows based on received QoS flow information. In some cases, the QoS flow information may be preconfigured by the network. In some other cases, the QoS flow information may be created dynamically, for example, dynamically assigned by IP addresses. The QoS flow information may also be provided to a user plane function (UPF) of the network by an external data network (DN) that comprises an application server. However, in the interest of enhanced personal security, service providers (e.g., an application, an application server, or a mid-node) may provide data directly to users rather than through a carrier. Hence, a firewall (e.g., network address translation (NAT)) may be disposed between the network and the server. This leads to a difference in the packet address between the DN and the network, preventing the DN from providing valid QoS flow information to the network.

In view of the above, the disclosure is related to methods for a PFD management driven by UE and associated apparatuses. In one aspect, a UE establishes a QoS flow with a core network (CN) for a data flow of an application. Upon a change in the data flow, the UE creates a UE-requested PFD and sends a request to the CN for updating a CN PFD to an updated PFD using the UE-requested PFD. A downlink (DL) packet is then transmitted to the UE from the CN based on the updated PFD. By employing a UE-driven method for PFD management, PFD updates are acquired from the UE, and thus the firewall between the network and the server does not prevent the network from receiving valid QoS flow information.

In some further aspects of the disclosure, an uplink (UL) packet is transmitted to the CN mapped to a QoS flow based on a differentiated services code point (DSCP) mark derived from the updated PFD and received with the DL packet. In one aspect, the DSCP value of the DSCP mark is provided by or derived from the UE-requested PFD. The UE-requested PFD may comprise the same DSCP value. By using the DSCP mark, the UPF is saved from creating reflective QoS packets and also more than one data flow is allowed for configuration. Adopting the DSCP mark may be more beneficial than other alternative approaches such as NAS signaling or using a reflective QoS indicator (RQI) setting transmitted with the DL packet to subsequently update a QoS rule for the UE. In using the NAS signaling, NAS load is added, preventing the CN from updating PFDs frequently. In addition, NAS messages cannot provide data flow authentication information to the CN, preventing the CN from recognizing which application(s) the data flow(s) belong to. In using the RQI setting, the UPF of the network needs to inspect packet flow, such as performing a deep packet inspection (DPI) using packet filters, to create a reflective QoS packet, which consumes UPF resources and reduces UPF capacity. In addition, the packet filters are pre-configured on the UPF, making it difficult to maintain and update. Further, by using the reflective QoS, the UE needs to support service data adaptation protocol (SDAP), and can allow configuration of no more than one data flow.

FIG. 1 illustrates a block diagram illustrating an architecture of a wireless system 100 including a UE 101 and a CN 120 in accordance with some aspects. The following description is provided in conjunction with 5G or NR system standards as provided by 3GPP technical specifications. However, the example aspects are not limited in this regard, and the described aspects can apply to other networks that benefit from the principles described herein, such as other 3GPP systems (e.g., Fourth Generation (4G) or Sixth Generation (6G)) systems, IEEE 802.16 protocols (e.g., WMAN, WiMAX, etc.), or the like.

As shown by FIG. 1, the wireless system 100 includes UE 101a and UE 101b (collectively referred to as "UEs 101" or "UE 101"). In this example, UEs 101 are illustrated as smartphones (e.g., handheld touchscreen mobile computing devices connectable to one or more cellular networks), but can comprise any mobile or non-mobile computing device, such as consumer electronics devices including headset, handset, cellular phones, smartphones, feature phones, tablet computers, wearable computer devices, personal digital assistants (PDAs), pagers, wireless handsets, desktop computers, laptop computers, in-vehicle infotainment (IVI), in-car entertainment (ICE) devices, an Instrument Cluster (IC), head-up display (HUD) devices, onboard diagnostic (OBD) devices, dashtop mobile equipment (DME), mobile data terminals (MDTs), Electronic Engine Management System (EEMS), electronic/engine control units (ECUs), electronic/engine control modules (ECMs), embedded systems, microcontrollers, control modules, engine management systems (EMS), networked or "smart" appliances, Machine Type Communication (MTC) devices, Machine to Machine (M2M), Internet of Things (IoT) devices, and/or the like.

The UEs 101 can be configured to connect, for example, communicatively couple, with a Radio Access Network (RAN) 110. In some aspects, the RAN 110 can be a next generation (NG) RAN or a 5G RAN, an evolved-UMTS Terrestrial RAN (E-UTRAN), or a legacy RAN, such as a UTRAN or GERAN. As used herein, the term "NG RAN" or the like can refer to a RAN 110 that operates in an NR or 5G wireless system 100, and the term "E-UTRAN" or the like can refer to a RAN 110 that operates in an long term evolution (LTE) or 4G system 100. The UEs 101 utilize connections (or channels) 102 and 104, which respectively comprise a physical communications channel/interface. In this example, the connections 102 and 104 are illustrated as an air interface to enable communicative coupling and can be consistent with cellular communications protocols, such as a Global System for Mobile communications (GSM) protocol, a Code-Division Multiple Access (CDMA) network protocol, a Push-to-Talk (PTT) protocol, a PTT over-cellular (POC) protocol, a Universal Mobile Telecommunications Service (UMTS) protocol, a 3GPP LTE protocol, a 5G protocol, an NR protocol, and/or any of the other communications protocols discussed herein. In aspects, the UEs 101 can directly exchange communication data via a ProSe interface 105. The ProSe interface 105 can alternatively be referred to as an SL interface 105 and can comprise one or more logical channels, including but not limited to a physical sidelink control channel (PSCCH), a physical sidelink shared channel (PSSCH), a physical sidelink discovery channel (PSDCH), and a physical sidelink broadcast channel (PSBCH).

The RAN 110 can include one or more RAN nodes including base stations (BS) 111a and 111b (collectively referred to as "BS 111"), that enable the connections 102 and 104. As used herein, the terms "access node," "access point," or the like can describe equipment that provides the radio baseband functions for data and/or voice connectivity between a network and one or more users. These BS can be referred to as access nodes, gNBs, RAN nodes, eNBs, NodeBs, RSUs, Transmission Reception Points (TRxPs) or TRPs, and so forth, and can comprise ground stations (e.g., terrestrial access points) or satellite stations providing coverage within a geographic area (e.g., a cell). According to various aspects, the BS 111 can be implemented as one or more of a dedicated physical device such as a macrocell base station and/or a low power (LP) base station for providing femtocells, picocells, or other like cells having smaller coverage areas, smaller user capacity, or higher bandwidth compared to macrocells.

The RAN 110 is communicatively coupled to a CN 120. The CN 120 is configured to offer various data and telecommunications services to customers/subscribers (e.g., users of UEs 101) who are connected to the CN 120 via the RAN 110. The CN 120 can comprise a network exposure function (NEF) 122, a session management function (SMF) 124, and a UPF 126.

A data network (DN) 130 may communicate with the UPF 126 via an interface 127 (e.g., N6 reference point). In some aspects, the DN 130 comprises an application server. In some aspects, the application server of the DN 130 communicates with the UPF 126 via the interface 127. The DN 130 can also be configured to support one or more communication services (e.g., VoIP sessions, PTT sessions, group communication sessions, social networking services, etc.) for the UEs 101 via the CN 120. In some aspects, the UE 101 derives uplink traffic related information and collects downlink traffic related information from a peer UE or the DN 130 as indicated by arrow 107. For example, the downlink traffic related information may be collected through an application layer protocol. The downlink traffic related information may be per IP flow or per port, and such low-level information may not be directly accessible by the CN 120. In some aspects, the DN 130 communicates with and/or comprises an application function (AF) (not shown) that communicates directly with the CN 120 to provide QoS flow information.

For the DN 130 or the AF to provide QoS flow information (e.g., QoS class of identifier (QCI)) to the UPF 126 via the interface 127, the DN 130 must communicate directly with the CN 120. However, a firewall (e.g., network address translation (NAT)) may be disposed between the CN 120 and the DN 130, leading to a difference in the packet address between the DN 130 and the CN 120 and preventing the DN 130 from providing valid QoS flow information to the CN 120. To provide valid QoS flow information to the CN 120, in one aspect, the UE 101 establishes a QoS flow with the CN 120 for a data flow of an application. Upon a change in the data flow, the UE 101 creates a UE-requested PFD and sends a request to the NEF 122 via an interface (e.g., N33 interface) for updating a CN PFD to an updated PFD using the UE-requested PFD as indicated by arrow 106. The NEF 122 first distributes the UE-requested PFD to the SMF 124 via a second interface 123 (e.g., N29 reference point), and the SMF 124 distributes the UE-requested PFD to the UPF 126 via a third interface 125 (e.g., N4 reference point). A DL packet is then transmitted to the UE 101 from the CN 120 mapping to QoS flows based on the updated PFD. By employing a UE-driven method for PFD management, a firewall between the CN 120 and the DN 130 does not prevent the CN 120 from receiving valid QoS flow information.

Figure 2:
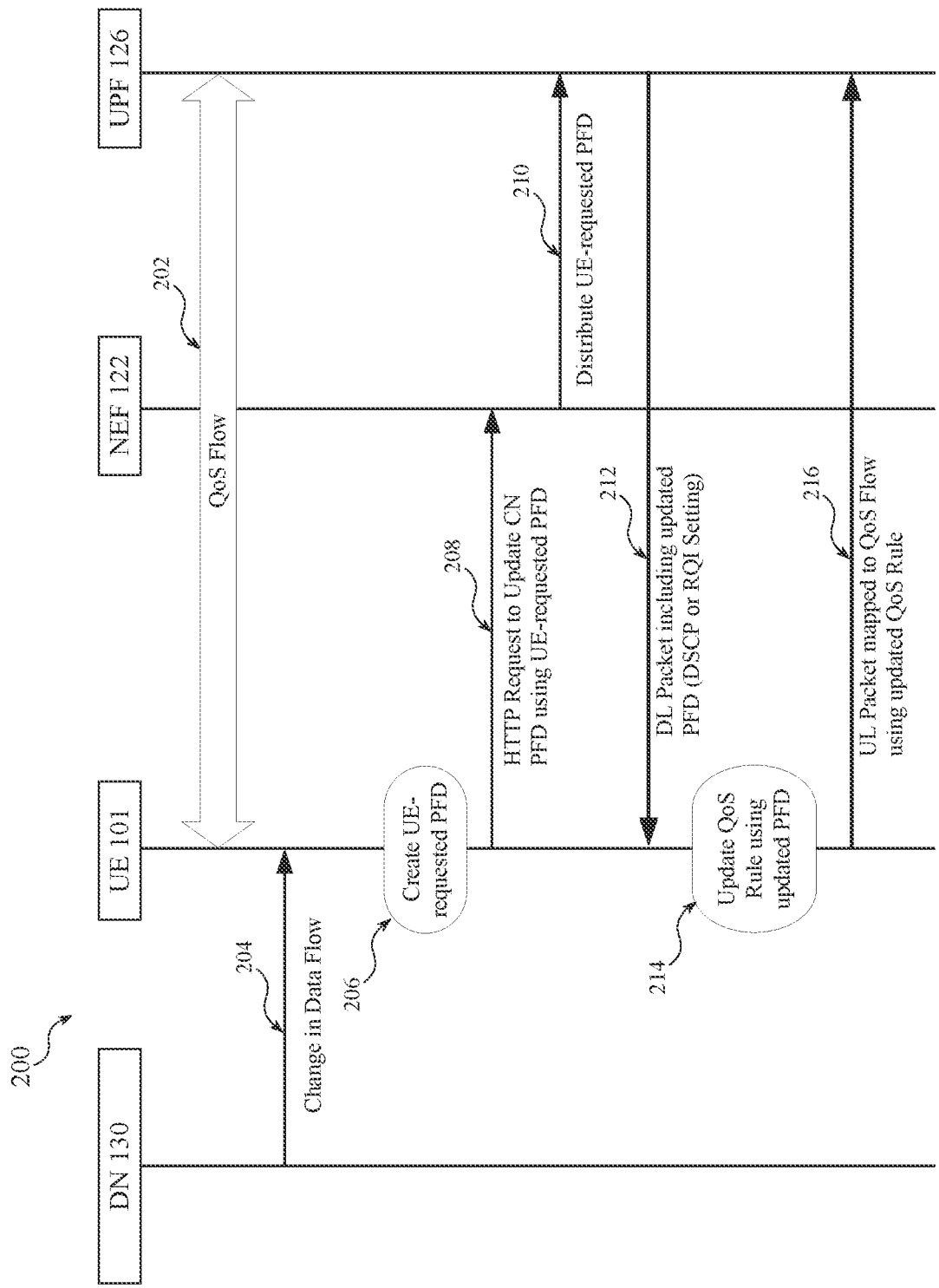
FIG. 2 illustrates a flow diagram showing a method for UE-driven packet flow description (PFD) management to update mapping a data flow to of a QoS flow upon a change in the data flow.

FIG. 2 illustrates a flow diagram showing a method for a PFD management driven by a UE to update mapping a data flow to a QoS flow upon a change in the data flow.

In some aspects, at act 202, a QoS flow is established between the CN 120 and the UE 101 for a data flow of an application within a PDU session. In some aspects, a plurality of data flows may be created by an application, and a plurality of QoS flows may be correspondingly established between the CN 120 and the UE 101. In some aspects, the number of data flows created may be greater than the number of QoS flows established.

In some aspects, at act 204, when the application changes the data flow, the DN 130 may notify the UE 101 of the change in the data flow via an application programming interface (API), or an operating system (OS) of the UE 101 may identify the change in the data flow. In some alternative aspects, the change in the data flow may instead be or comprise a refresh of the data flow by a mid-node, a new data flow added by the application, or a change in the data flow by the server due to load balance, traffic engineering policy, or the like. In some aspects, the DN 130 communicates with and/or comprises an AF (not shown) that notifies the UE 101 of the change in the data flow.

In some aspects, at act 206, the UE 101 creates a UE-requested PFD. In some aspects, the UE-requested PFD may be a 3-tuple of protocol, server-side IP address, and port number. In some aspects, the UE-requested PFD may differ from a CN PFD and may comprise updating information for the CN PFD. In some aspects, the UE-requested PFD may comprise a DSCP mark having a DSCP value.

In some aspects, at act 208, the UE 101 sends a request to the NEF 122 via a first interface (e.g., N33 reference point) to update the CN PFD using the UE-requested PFD. In some aspects, the request uses HTTP as a transport layer protocol, and thus the request is an HTTP request. In some aspects, the HTTP request is an HTTP PUT function. In some of such aspects, the UE-requested PFD is a parameter of the HTTP PUT function. In some aspects, after successfully receiving the HTTP request from the UE 101, the NEF 122 sends a confirmation that the request was received. In some of such aspects, the confirmation is an HTTP 200 response.

In some aspects, at act 210, the NEF 122 distributes the UE-requested PFD to the UPF 126. In some aspects, upon receiving the UE-requested PFD, the UPF 126 determines whether to accept the UE-requested PFD. If the UE-requested PFD is accepted, the CN PFD is updated to an updated PFD. If the UE-requested PFD is rejected, the CN PFD is maintained.

In some aspects, at act 212, the UPF 126 transmits a DL packet mapped to a QoS flow based on the CN PFD or the updated PFD if the UE-requested PFD is accepted. In some further aspects, the DL packet may include information for a reflective QoS for UL packet mapping. In some aspects, an IP header of the DL packet includes a DSCP mark included in or derived from the updated PFD. In one aspect, DL packet has a same DSCP value as the UE-requested PFD. Alternatively, the DL packet may include a RQI setting derived from the updated PFD. However, in using the RQI setting, the UPF 126 needs to inspect packet flow, such as performing a DPI using packet filters, to create a reflective QoS packet, which consumes UPF 126 resources and reduces UPF 126 capacity. In addition, the packet filters are pre-configured on the UPF 126, making it difficult to maintain and update. Further, in using the RQI setting, the UE 101 needs to support SDAP and can allow configuration of no more than one data flow. By instead using the DSCP mark, the UE 101 does not need to support SDAP, and can thus allow configuration of multiple data flows. Further, the UPF 126 does not inspect packet flow using pre-configured packet filters, and hence the UE 101 is able to provide QoS flow information to the CN 120. In addition, UPF 126 resources are not consumed and UPF 126 capacity is not reduced. In some aspects, a QoS profile of the UPF 126 is updated based on the UE-requested PFD.

In some aspects, at act 214, after receiving the DL packet from the UPF 126, the UE 101 uses information of the DL packet to configure or derive mapping of an UL packet. In some aspects, the updated PFD is utilized to update a QoS rule of the UE 101 based on the received DSCP mark or the RQI setting. In some aspects, the UE 101 further updates a packet filter based on the received DL packet. By employing a UE-driven method for PFD management, the QoS rule is updated without the CN 120 and the DN 130 directly communicating, and thus a firewall does not prevent the QoS flow update.

In some aspects, the UE 101, at act 216, the UE transmits the UL packet mapped to a QoS flow using the updated QoS rule and/or the updated PFD to the UPF 126. By employing a UE-driven method for PFD management, the UE 101 is able to update a QoS flow between the UE 101 and the CN 120 for the UL packet, thus a firewall between the CN 120 and the DN 130 does not prevent the CN 120 from receiving valid QoS flow information. In some aspects, the UL packet is mapped to a plurality of QoS flows using a plurality of updated PFDs.

Figure 3:
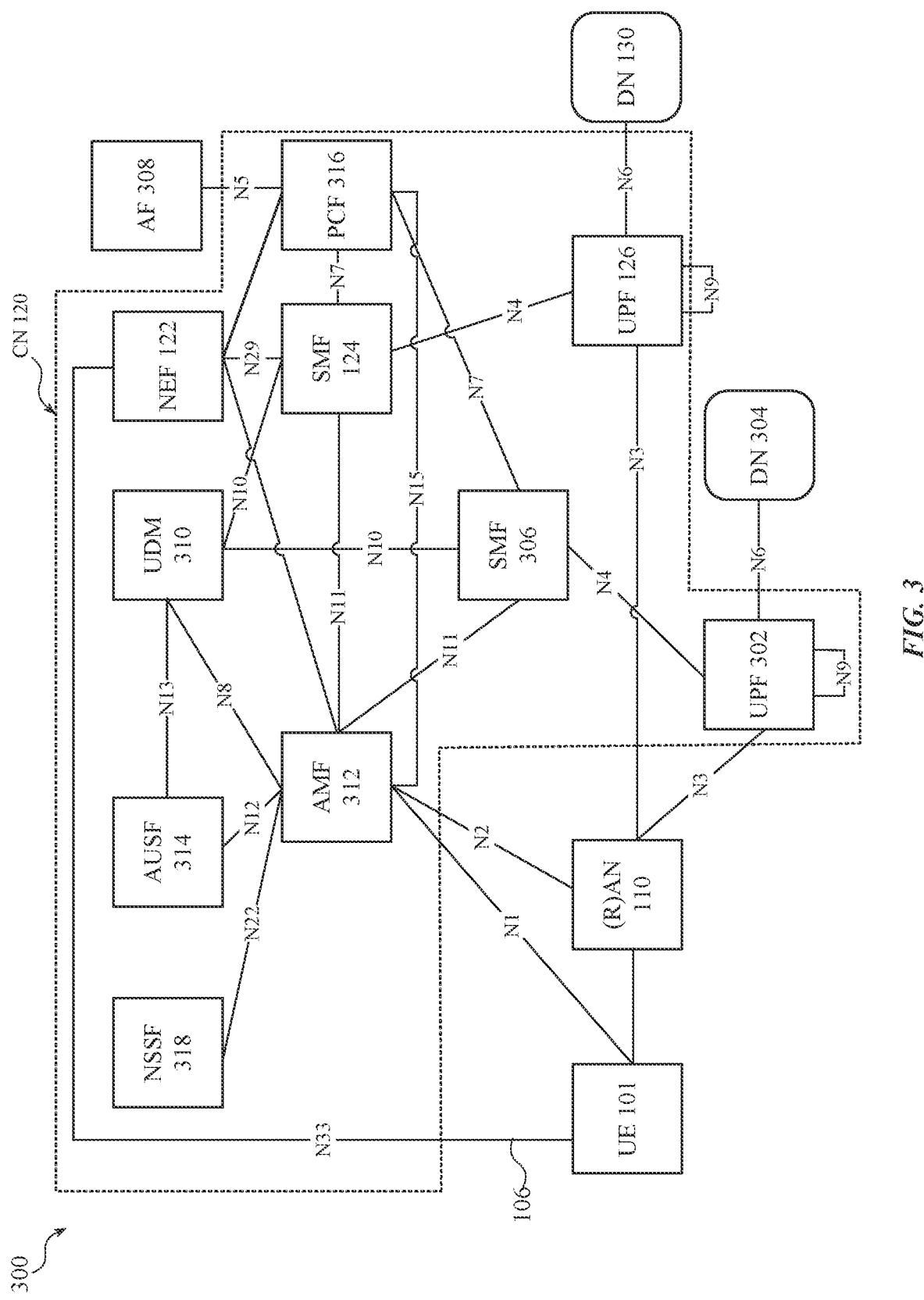
FIG. 3 illustrates an example system architecture in accordance with some aspects.

FIG. 3 illustrates an example system architecture 300 in accordance with some aspects. The system 300 is shown to include a UE 101, a (R)AN 110, and which may include BS 111 discussed previously, a first DN 130 and a second DN 304, which may be, for example, application servers, operator services, Internet access or 3rd party services; an AF 308, and a CN 120. In some aspects, the CN 120 may be a 5G Core network (e.g., 5GC). The CN 120 may include an Authentication Server Function (AUSF 314), an Access & Mobility Management Function (AMF) 312, a first SMF 124, a second SMF 306, a NEF 122, a Network Slice Selection Function (NSSF) 318, a Policy Control Function (PCF) 316, a Unified Data Management (UDM) 310, a first UPF 126, and a second UPF 302.

The NEF 122 may provide means for securely exposing the services and capabilities provided by 3GPP network functions for third party, internal exposure/re-exposure, application functions (e.g., AF 308), edge computing or fog computing systems, etc. In such aspects, the NEF 122 may authenticate, authorize, and/or throttle the AFs. The NEF 122 may also translate information exchanged with the AF 308 and information exchanged with internal network functions. For example, the NEF 122 may translate between an AF-Service-Identifier and an internal 5GC information. The NEF 122 may also receive information from other network functions (NFs) based on exposed capabilities of other network functions. This information may be stored at the NEF 122 as structured data, or at a data storage NF using standardized interfaces. The stored information can then be re-exposed by the NEF 122 to other NFs and AFs, and/or used for other purposes such as analytics. Additionally, the NEF 122 may exhibit an Nnef service-based interface.

The NEF 122 may directly interact with the UE 101 via an N33 interface 106. In some aspects, the UE 101 may send a request to the NEF 122 comprising the UE-requested PFD as described with respect to FIG. 2 via the N33 interface. The NEF 122 may interact with the first SMF 124 via an N29 interface. In some aspects, the NEF 122 may distribute the UE-requested PFD to the first SMF 124 via the N29 interface.

The first UPF 126 and the second UPF 302 may act as anchor points for intra-RAT and inter-RAT mobility, external PDU session points of interconnect to DN 130 and DN 304, respectively, and a branching point to support multi-homed PDU session. The first UPF 126 and the second UPF 302 may also perform packet routing and forwarding, perform packet inspection, enforce the user plane part of policy rules, lawfully intercept packets (UP collection), perform traffic usage reporting, perform QoS handling for a user plane (e.g., packet filtering, gating, UL/DL rate enforcement), perform uplink traffic verification (e.g., SDF to QoS flow mapping), transport level packet marking in the uplink and downlink, and perform downlink packet buffering and downlink data notification triggering. The first UPF 126 and the second UPF 302 may include an uplink classifier to support routing traffic flows to a data network.

The first DN 130 and the second DN 304 may represent various network operator services, Internet access, or third-party services. The first DN 130 and the second DN 304 may include an application server. The first UPF 126 may interact with the first SMF 124 via a first N4 reference point between the first SMF 124 and the first UPF 126. The second UPF 302 may interact with the second SMF 306 via a second N4 reference point between the second UPF 302 and the second SMF 306. In some aspects, the first SMF 124 may distribute the UE-requested PFD to the first UPF 126 via the N4 reference point. In some aspects, the first UPF 126 comprises a CN PFD and determines whether to accept the UE-requested PFD, and upon accepting the UE-requested PFD, the first UPF 126 updates the CN PFD to an updated PFD using the UE-requested PFD. In some aspects, the first UPF 126 sends a DL packet with a DSCP mark if there are one or more QoS flows in the UE-requested PFD. In some aspects, the first UPF 126 sends a DL packet with an RQI setting if there is a single QoS flow in the UE-requested PFD. In some aspects, the first DN 130 is external to the CN 120. In some aspects, the first DN 130 communicates with and/or comprises the AF 308.

The AF 308 may provide application influence on traffic routing, provide access to the NCE, and interact with the policy framework for policy control. The NCE may be a mechanism that allows the 5GC 120 and AF 308 to provide information to each other via NEF 122, which may be used for edge computing implementations. In such implementations, the network operator and third-party services may be hosted close to the UE 101 access point of attachment to achieve an efficient service delivery through the reduced end-to-end latency and load on the transport network. For edge computing implementations, the 5GC may select a UPF (e.g., the first UPF 126 or the second UPF 302) close to the UE 101 and execute traffic steering from the first UPF 126 to the first DN 130 via the N6 interface, and/or from the second UPF 302 to the second DN 304 via the N6 interface. This may be based on the UE subscription data, UE location, and information provided by the AF 308. In this way, the AF 308 may influence UPF (re)selection and traffic routing. Based on operator deployment, when AF 308 is considered to be a trusted entity, the network operator may permit AF 308 to interact directly with relevant NFs. Additionally, the AF 308 may exhibit an Naf service-based interface. In some aspects, a firewall (e.g., network address translation (NAT)) may be disposed between the PCF 316 and the AF 308. This leads to a difference in the packet address between the AF 308 and the CN 120, preventing the AF 308 from providing valid QoS flow information to the CN 120. Hence, by performing UE-driven PFD management, this QoS flow information can be provided by the UE 101, so the firewall does not prevent this information from being provided to the CN 120.

The AUSF 314 may store data for authentication of UE 101 and handle authentication-related functionality. The AUSF 314 may facilitate a common authentication framework for various access types. The AUSF 314 may communicate with the AMF 312 via an N12 reference point between the AMF 312 and the AUSF 314, and may communicate with the UDM 310 via an N13 reference point between the UDM 310 and the AUSF 314. Additionally, the AUSF 314 may exhibit an Nausf service-based interface.

The AMF 312 may be responsible for registration management (e.g., for registering UE 101, etc.), connection management, reachability management, mobility management, and lawful interception of AMF-related events, and access authentication and authorization. The AMF 312 may be a termination point for N11 reference points between the AMF 312 and the first SMF 124 and between the AMF 312 and the second SMF 306. The AMF 312 may provide transport for SM messages between the UE 101 and the first SMF 124 and between the UE 101 and the second SMF 306, and act as a transparent proxy for routing SM messages. AMF 312 may also provide transport for SMS messages between UE 101 and a Short Message Service Function (SMSF) (not shown by FIG. 3). AMF 312 may act as a Security Anchor Function (SEAF), which may include interaction with the AUSF 314 and the UE 101, receipt of an intermediate key that was established as a result of the UE 101 authentication process. Where universal subscriber identity module (USIM) based authentication is used, the AMF 312 may retrieve the security material from the AUSF 314. AMF 312 may also include a SCM function, which receives a key from the SEA that it uses to derive access-network specific keys. Furthermore, AMF 312 may be a termination point of a RAN control plane (CP) interface, which may include or be an N2 reference point between the (R)AN 110 and the AMF 312, and the AMF 312 may be a termination point of NAS (N1) signaling, and perform NAS ciphering and integrity protection.

The AMF 312 may also support NAS signaling with a UE 101 over an non-3GPP (N3) interworking function (IWF) interface. The N3IWF may be used to provide access to untrusted entities. N3IWF may be a termination point for the N2 interface between the (R)AN 110 and the AMF 312 for the control plane, and may be a termination point for the N3 reference points between the (R)AN 110 and the first UPF 126 and the (R)AN 110 and the second UPF 302 for the user plane. As such, the AMF 312 may handle N2 signaling from the SMF 624 and the AMF 312 for PDU sessions and QoS, encapsulate/de-encapsulate packets for IPSec and N3 tunnelling, mark N3 user-plane packets in the uplink, and enforce QoS corresponding to N3 packet marking taking into account QoS requirements associated with such marking received over N2. N3IWF may also relay uplink and downlink control-plane NAS signaling between the UE 101 and AMF 312 via an N1 reference point between the UE 101 and the AMF 312, and relay uplink and downlink user-plane packets between the UE 101 and first UPF 126 and between the UE 101 and the second UPF 302. The N3IWF also provides mechanisms for IPsec tunnel establishment with the UE 101. The AMF 312 may exhibit an Namf service-based interface, and may be a termination point for an N14 reference point between two AMFs 312 and an N17 reference point between the AMF 312 and a 5G-EIR (not shown by FIG. 6).

The UE 101 may need to register with the AMF 312 in order to receive network services. RM is used to register or deregister the UE 101 with the network (e.g., AMF 312), and establish a UE context in the network (e.g., AMF 312). The UE 101 may operate in an RM-REGISTERED state or an RM-DEREGISTERED state. In the RM-DEREGISTERED state, the UE 101 is not registered with the network, and the UE context in the AMF 312 holds no valid location or routing information for the UE 101 so the UE 101 is not reachable by the AMF 312. In the RM-REGISTERED state, the UE 101 is registered with the network, and the UE context in the AMF 312 may hold a valid location or routing information for the UE 101 so the UE 101 is reachable by the AMF 312. In the RM-REGISTERED state, the UE 101 may perform mobility Registration Update procedures, perform periodic Registration Update procedures triggered by expiration of the periodic update timer (e.g., to notify the network that the UE 101 is still active), and perform a Registration Update procedure to update UE capability information or to re-negotiate protocol parameters with the network, among others.

The AMF 312 may store one or more RM contexts for the UE 101, where each RM context is associated with a specific access to the network. The RM context may be a data structure, database object, etc. that indicates or stores, inter alia, a registration state per access type and the periodic update timer. The AMF 312 may also store a 5GC MM context that may be the same or similar to the (E)MM context discussed previously. In various aspects, the AMF 312 may store a common emitter (CE) mode B Restriction parameter of the UE 101 in an associated MM context or RM context. The AMF 312 may also derive the value, when needed, from the UE's usage setting parameter already stored in the UE context (and/or MM/RM context).

The connection management (CM) may be used to establish and release a signaling connection between the UE 101 and the AMF 312 over the N1 interface. The signaling connection is used to enable NAS signaling exchange between the UE 101 and the CN 120, and comprises both the signaling connection between the UE and the AN (e.g., RRC connection or UE-N3IWF connection for non-3GPP access) and the N2 connection for the UE 101 between the AN (e.g., the RAN 110) and the AMF 312. The UE 101 may operate in one of two CM states, CM-IDLE mode or CM-CONNECTED mode. When the UE 101 is operating in the CM-IDLE state/mode, the UE 101 may have no NAS signaling connection established with the AMF 312 over the N1 interface, and there may be (R)AN 110 signaling connection (e.g., N2 and/or N3 connections) for the UE 101. When the UE 101 is operating in the CM-CONNECTED state/mode, the UE 101 may have an established NAS signaling connection with the AMF 312 over the N1 interface, and there may be a (R)AN 110 signaling connection (e.g., N2 and/or N3 connections) for the UE 101. Establishment of an N2 connection between the (R)AN 110 and the AMF 312 may cause the UE 101 to transition from CM-IDLE mode to CM-CONNECTED mode, and the UE 101 may transition from the CM-CONNECTED mode to the CM-IDLE mode when N2 signaling between the (R)AN 110 and the AMF 312 is released.

The first SMF 124 and the second SMF 306 may be responsible for SM (e.g., session establishment, modify and release, including tunnel maintain between the UPF and an AN node); UE IP address allocation and management (including optional authorization); selection and control of UP function; configuring traffic steering at the UPF to route traffic to proper destination; termination of interfaces toward policy control functions; controlling part of policy enforcement and QoS; lawful intercept (for SM events and interface to LI system); termination of SM parts of NAS messages; downlink data notification; initiating AN specific SM information, sent via AMF over N2 to AN; and determining SSC mode of a session. SM may refer to management of a PDU session, and a PDU session or "session" may refer to a PDU connectivity service that provides or enables the exchange of PDUs between the UE 101 and the first DN 130 and between the UE 101 and the second DN 304 identified by a Data Network Name (DNN). PDU sessions may be established upon UE 101 request, modified upon UE 101 and 5GC 120 request, and released upon the UE 101 and the CN 120 request using NAS SM signaling exchanged over the N1 reference points between the UE 101 and the first SMF 124 and between the UE 101 and the second SMF 306. Upon request from an application server, the CN 120 may trigger a specific application in the UE 101. In response to receipt of the trigger message, the UE 101 may pass the trigger message (or relevant parts/information of the trigger message) to one or more identified applications in the UE 101. The identified application(s) in the UE 101 may establish a PDU session to a specific DNN. The first SMF 124 and/or the second SMF 306 may check whether the UE 101 requests are compliant with user subscription information associated with the UE 101. In this regard, the first SMF 124 and/or the second SMF 306 may retrieve and/or request to receive update notifications on first SMF 124 and/or second SMF 306 level subscription data from the UDM 310.

The first SMF 124 and the second SMF 306 may include the following roaming functionality: handling local enforcement to apply QoS SLAs (VPLMN); charging data collection and charging interface (VPLMN); lawful intercept (in VPLMN for SM events and interface to LI system); and support for interaction with an external DN for transport of signaling for PDU session authorization/authentication by the external DN. Additionally, the first SMF 124 and/or the second SMF 306 may exhibit the Nsmf service-based interface.

The PCF 316 may provide policy rules to control plane function(s) to enforce them, and may also support unified policy framework to govern network behavior. The PCF 316 may also implement an FE to access subscription information relevant for policy decisions in a UDR of the UDM 310. The PCF 316 may communicate with the AMF 312 via an N15 reference point between the PCF 316 and the AMF 312, which may include a PCF 316 in a visited network and the AMF 312 in case of roaming scenarios. The PCF 316 may communicate with the AF 308 via an N5 reference point between the PCF 316 and the AF 308; and with the first SMF 124 and the second SMF 306 via N7 reference points between the PCF 316 and the first SMF 124 and between the PCF 316 and the second SMF 306. The system 300 and/or CN 120 may also include an N24 reference point between the PCF 316 (in the home network) and a PCF 316 in a visited network. Additionally, the PCF 316 may exhibit an Npcf service-based interface.

In some aspects, a firewall (e.g., network address translation (NAT)) may be disposed at the N5 reference point between the PCF 316 and the AF 308, at the N6 reference point between the first UPF 126 and the first DN 130, and at the N6 reference point between the second UPF 302 and the second DN 304. This leads to a difference in the packet address between the AF 308 and the CN 120, between the first DN 130 and the CN 120, and between the second DN 304 and the CN 120. This prevents the AF 308, the first DN 130, and the second DN 304 from providing valid QoS flow information to the CN 120. Hence, by performing UE-driven PFD management, this QoS flow information can be provided by the UE 101, so the firewall does not prevent this information from being provided to the CN 120.

The UDM 310 may handle subscription-related information to support the network entities' handling of communication sessions, and may store subscription data of UE 101. For example, subscription data may be communicated between the UDM 310 and the AMF 312 via an N8 reference point between the UDM 310 and the AMF. The UDM 310 may include two parts, an application FE and a UDR (the FE and UDR are not shown by FIG. 3). The UDR may store subscription data and policy data for the UDM 310 and the PCF 316, and/or structured data for exposure and application data (including PFDs for application detection, application request information for multiple UEs 101) for the NEF 122. The UDM may include a UDM-FE, which is in charge of processing credentials, location management, subscription management and so on. Several different front ends may serve the same user in different transactions. The UDM-FE accesses subscription information stored in the UDR and performs authentication credential processing, user identification handling, access authorization, registration/mobility management, and subscription management. The UDR may interact with the first SMF 124 and/or the second SMF 306 via N10 reference points between the UDM 310 and the first SMF 124 and between the UDM 310 and the second SMF 306. UDM 310 may also support SMS management, wherein an SMS-FE implements the similar application logic as discussed previously. Additionally, the UDM 310 may exhibit the Nudm service-based interface.

The NSSF 318 may select a set of network slice instances serving the UE 101. The NSSF 318 may also determine allowed network slice selection assistance information (NS-SAI) and the mapping to the subscribed single-NSSAIs (S-NSSAIs), if needed. The selection of a set of network slice instances for the UE 101 may be triggered by the AMF 312 with which the UE 101 is registered by interacting with the NSSF 318, which may lead to a change of AMF 312. The NSSF 318 may interact with the AMF 312 via an N22 reference point between AMF 312 and NSSF 318; and may communicate with another NSSF 318 in a visited network via an N31 reference point (not shown by FIG. 3). Additionally, the NSSF 318 may exhibit an Nnssf service-based interface.

As discussed previously, the CN 120 may include an SMSF, which may be responsible for SMS subscription checking and verification, and relaying SM messages to/from the UE 101 to/from other entities, such as an SMS-GMSC/IWMSC/SMS-router. The SMS may also interact with AMF 312 and UDM 310 for a notification procedure that the UE 101 is available for SMS transfer (e.g., set a UE not reachable flag, and notifying UDM 310 when UE 101 is available for SMS).

The CN 120 may also include other elements that are not shown by FIG. 3, such as a Data Storage system/architecture, a 5G-EIR, a SEPP, and the like. The Data Storage system may include a SDSF, an UDSF, and/or the like. Any NF may store and retrieve unstructured data into/from the UDSF (e.g., UE contexts), via N18 reference point between any NF and the UDSF (not shown by FIG. 3). Individual NFs may share a UDSF for storing their respective unstructured data or individual NFs may each have their own UDSF located at or near the individual NFs. Additionally, the UDSF may exhibit an Nudsf service-based interface (not shown by FIG. 3). The 5G-EIR may be an NF that checks the status of PEI for determining whether particular equipment/entities are blacklisted from the network; and the SEPP may be a non-transparent proxy that performs topology hiding, message filtering, and policing on inter-PLMN control plane interfaces.

Additionally, there may be many more reference points and/or service-based interfaces between the NF services in the NFs; however, these interfaces and reference points have been omitted from FIG. 3 for clarity. Other example interfaces/reference points may include an N5g-EIR service-based interface exhibited by a 5G-EIR, an N27 reference point between the NRF in the visited network and the NRF in the home network; and an N31 reference point between the NSSF in the visited network and the NSSF in the home network.

Figure 4:
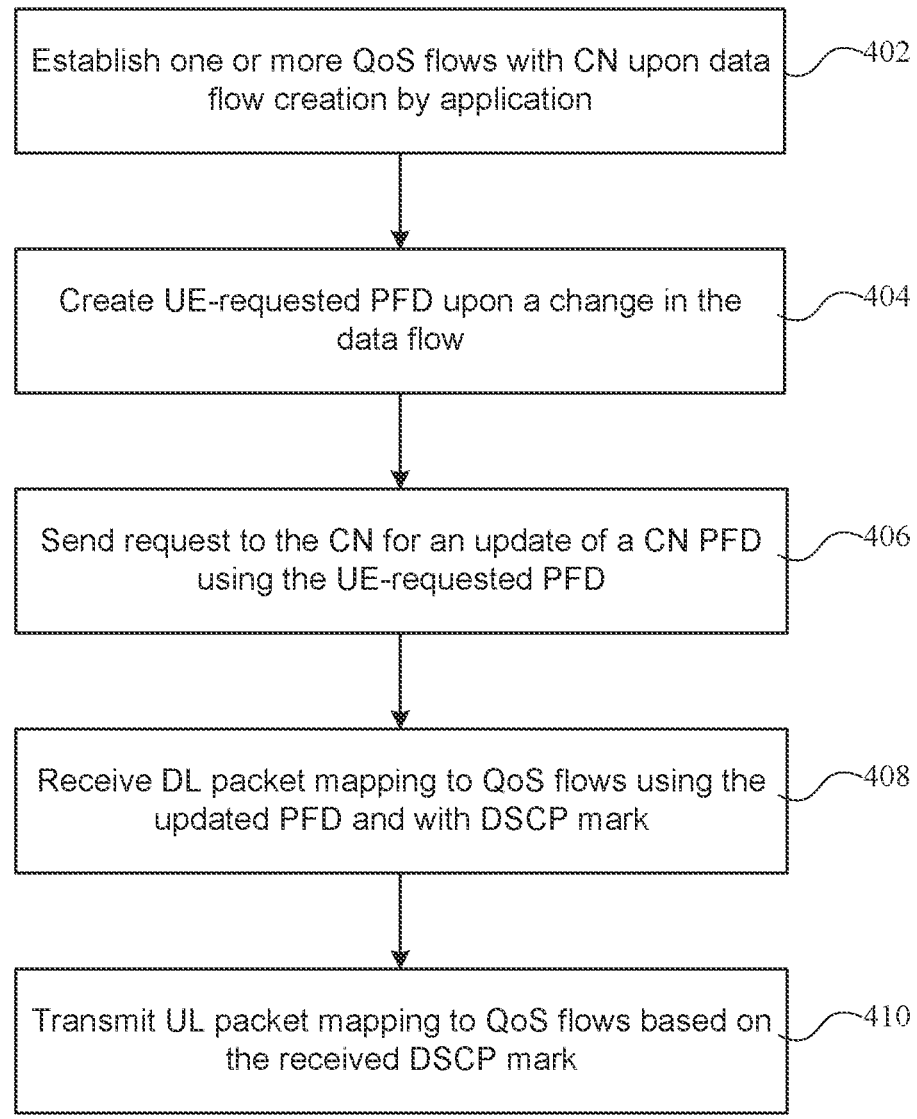
FIG. 4 illustrates a flowchart that describes a UE performing UE-driven packet flow description (PFD) management in accordance with some aspects.

FIG. 4 illustrates a flowchart that describes a UE performing UE-driven packet flow description (PFD) management in accordance with some aspects.

As shown by act 402, the UE establishes one or more QoS flows with a CN upon data flow creation by an application. In some aspects, the UE may establish one or more QoS flows in a PDU session.

As shown by act 404, the UE creates a UE-requested PFD upon a change in the data flow. In some aspects, the UE-requested PFD may comprise updating information. In some aspects, if the UE establishes more than one QoS flows, the UE-requested PFD may comprise a DSCP.

As shown by act 406, the UE sends a request to the CN for an update of a CN PFD using the UE-requested PFD. In some aspects, the UE sends a request to an NEF of the CN over an N33 interface. In some aspects, the request is an HTTP request.

As shown by act 408, the UE receives a DL packet mapping to the QoS flows using the updated PFD and with a DSCP mark. In some aspects the UE-requested PFD may have a DSCP mark with a same DSCP value as the DSCP mark of the DL packet. Alternatively, in some aspects, the DL packet may have an RQI setting rather than a DSCP mark.

As shown by act 410, the UE transmits a UL packet mapping to the QoS flows using an updated PFD based on the received DSCP mark. Alternatively, in some aspects, the UL packet may map to the QoS flows using the updated PFD based on a received RQI setting. In other alternative aspects, instead of mapping to the QoS flows based on a DSCP mark or an RQI setting, the UL packet may be mapped to the QoS flows using NAS signaling.

Figure 5:
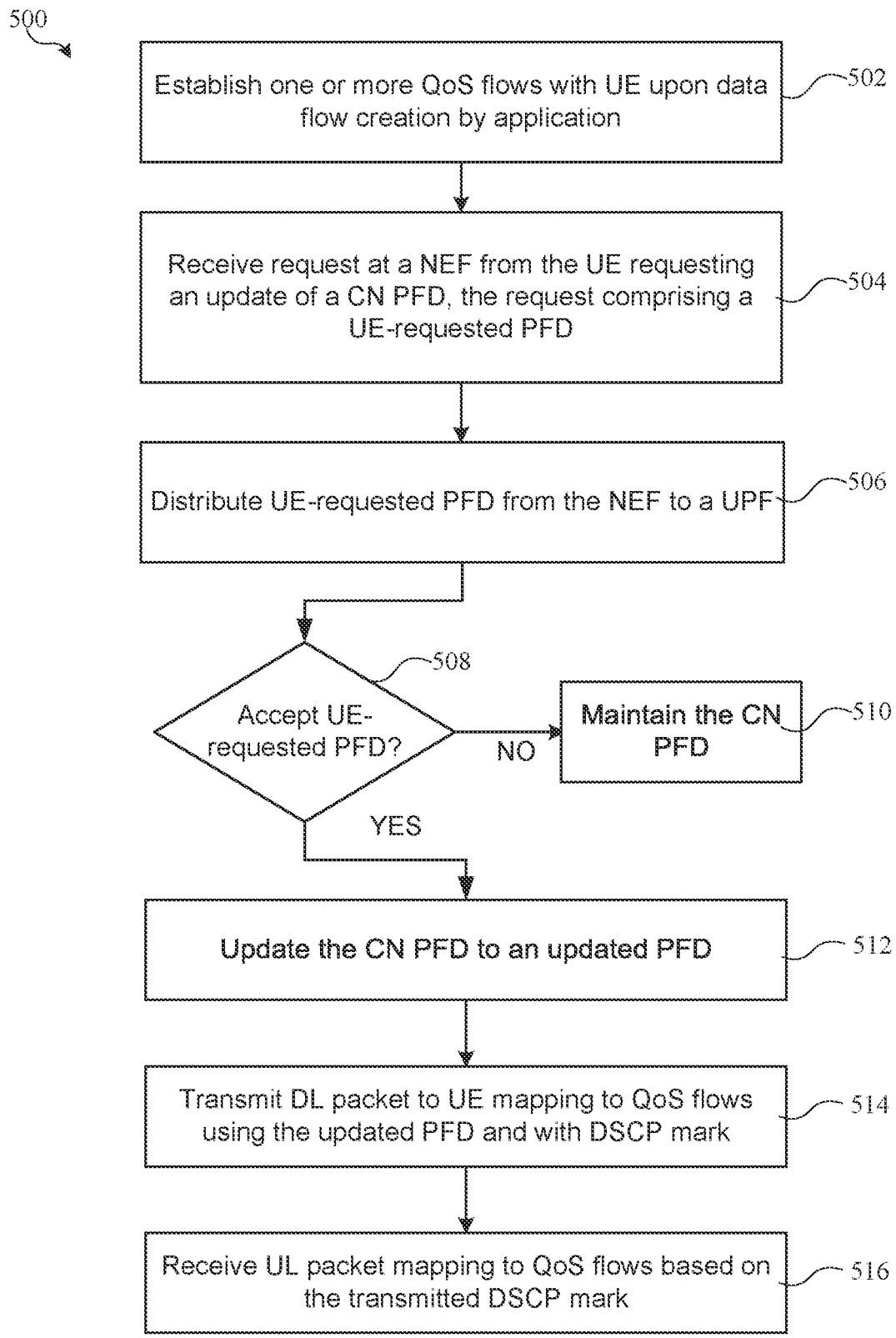
FIG. 5 illustrates a flowchart that describes a CN performing UE-driven packet flow description (PFD) management in accordance with some aspects.

FIG. 5 illustrates a flowchart that describes a CN performing UE-driven packet flow description (PFD) management in accordance with some aspects.

As shown by act 502, the CN establishes one or more QoS flows with a UE upon data flow creation by an application. In some aspects, the UE may establish one or more QoS flows in a PDU session.

As shown by act 504, in some aspects, the CN receives a request at a NEF from the UE requesting an update of a CN PFD, the request comprising the UE-requested PFD. In some aspects, the UE receives the request over an N33 interface. In some aspects, the request is an HTTP request.

As shown by act 506, the CN distributes the UE-requested PFD from the NEF to a UPF. In some aspects, the NEF distributes the UE-requested PFD to a SMF via a N29 interface, and the SMF distributes the UE-requested PFD to the UPF via a N4 interface.

As shown by act 508, the CN determines whether to accept the UE-requested PFD. In some aspects, the CN may determine whether to accept the UE-requested PFD based on information included in the UE-requested PFD. In some aspects, the CN may determine whether to accept the UE-requested PFD based on data available only to the CN. In some aspects, a QoS profile of the UPF is updated based on the UE-requested PFD.

As shown by act 510, if the CN determines not to accept the UE-requested PFD, the CN PFD is maintained. In some aspects, the CN sends a message (e.g., an HTTP response) to notify the UE that the UE-requested PFD was rejected.

As shown by act 512, if the CN determines to accept the UE-requested PFD, the CN PFD is updated to an updated PFD. In some aspects, the updated PFD is based on updating information provided by the UE-requested PFD. In some aspects, the updated PFD differs from both the UE-requested PFD and the CN PFD.

As shown by act 514, in some aspects, the CN transmits a DL packet to the UE mapping to the QoS flows using the updated PFD. In some further aspects, the DL packet is transmitted with a DSCP mark. Alternatively, in some aspects, the DL packet may have an RQI setting rather than a DSCP mark.

As shown by act 516, the CN receives a UL packet mapping to the plurality of QoS flows based on the transmitted DSCP. Alternatively, in some aspects, the UL packet may be mapped to the QoS flows using the updated PFD based on the received RQI setting. In other alternative aspects, instead of mapping to the QoS flows based on a DSCP mark or an RQI setting, the UL packet may map to the QoS flows using NAS signaling.

Figure 6:
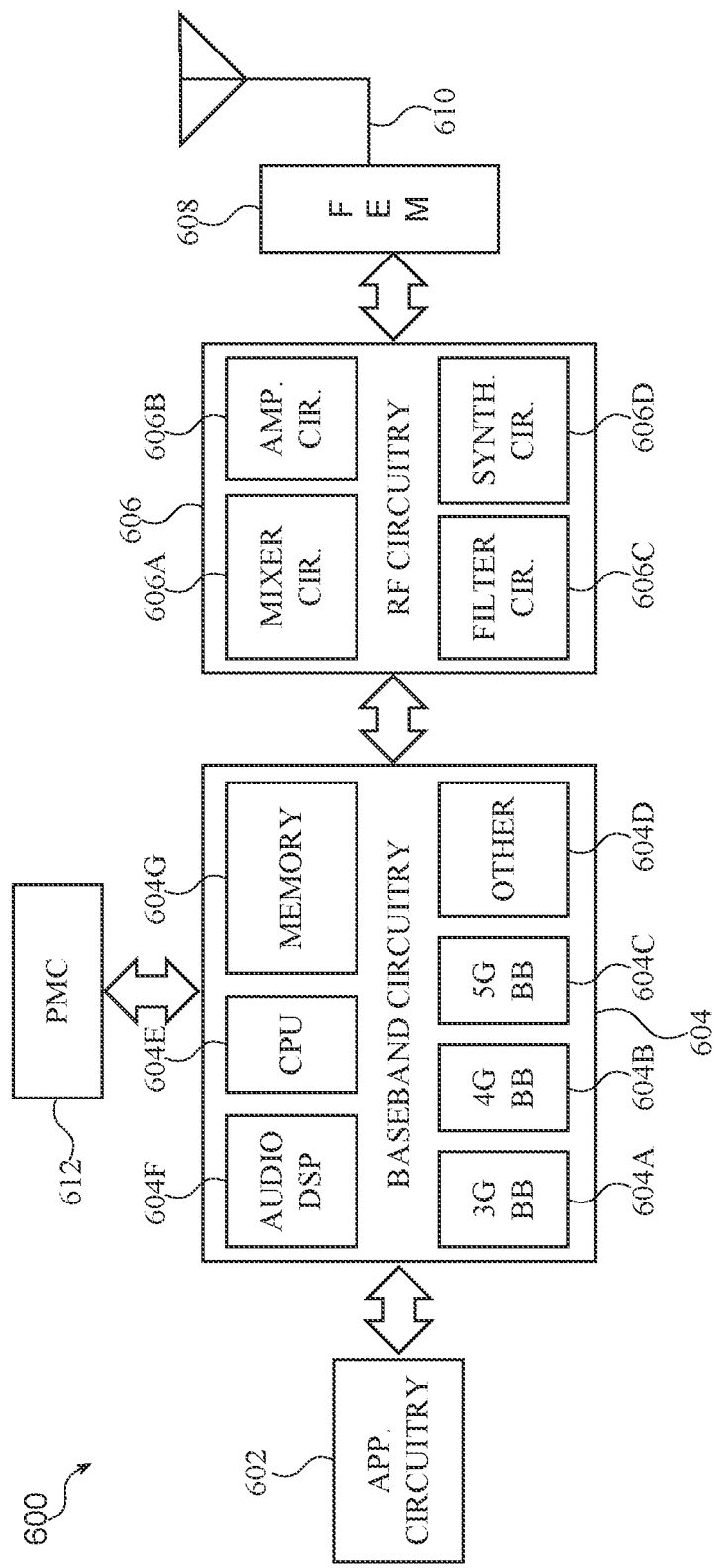
FIG. 6 illustrates a diagram illustrating example components of a device that can be employed in accordance with some aspects.

FIG. 6 illustrates a diagram illustrating example components of a device 600 that can be employed in accordance with some aspects. In some implementations, the device 600 can include application circuitry 602, baseband circuitry 604, Radio Frequency (RF) circuitry 606, front-end module (FEM) circuitry 608, one or more antennas 610, and power management circuitry (PMC) 612 coupled together at least as shown. The components of the illustrated device 600 can be included in a UE or a RAN node. In some implementations, the device 600 can include fewer elements (e.g., a RAN node may not utilize application circuitry 602 and instead include a processor/controller to process IP data received from a CN. In some implementations, the device 600 can include additional elements such as, for example, memory/storage, display, camera, sensor (including one or more temperature sensors, such as a single temperature sensor, a plurality of temperature sensors at different locations in device 600, etc.), or input/output (I/O) interface. In other implementations, the components described below can be included in more than one device (e.g., said circuitries can be separately included in more than one device for Cloud-RAN (C-RAN) implementations).

The application circuitry 602 can include one or more application processors. For example, the application circuitry 602 can include circuitry such as, but not limited to, one or more single-core or multi-core processors. The processor(s) can include any combination of general-purpose processors and dedicated processors (e.g., graphics processors, application processors, etc.). The processors can be coupled with or can include memory/storage and can be configured to execute instructions stored in the memory/storage to enable various applications or operating systems to run on the device 600. In some implementations, processors of application circuitry 602 can process IP data packets received from an evolved packet core (EPC).

The baseband circuitry 604 can include circuitry such as, but not limited to, one or more single-core or multi-core processors. The baseband circuitry 604 can include one or more baseband processors or control logic to process baseband signals received from a receive signal path of the RF circuitry 606 and to generate baseband signals for a transmit signal path of the RF circuitry 606. Baseband circuitry 604 can interface with the application circuitry 602 for generation and processing of the baseband signals and for controlling operations of the RF circuitry 606. For example, in some implementations, the baseband circuitry 604 can include a third generation (3G) baseband processor 604A, a fourth generation (4G) baseband processor 604B, a fifth generation (5G) baseband processor 604C, or other baseband processor(s) 604D for other existing generations, generations in development or to be developed in the future (e.g., second generation (2G), sixth generation (6G), etc.). The baseband circuitry 604 (e.g., one or more of baseband processors 604A-D) can handle various radio control functions that enable communication with one or more radio networks via the RF circuitry 606. In other implementations, some or all of the functionality of baseband processors 604A-D can be included in modules stored in the memory 604G and executed via a Central Processing Unit (CPU) 604E. The radio control functions can include but are not limited to signal modulation/demodulation, encoding/decoding, radio frequency shifting, etc. In some implementations, modulation/demodulation circuitry of the baseband circuitry 604 can include Fast-Fourier Transform (FFT), precoding, or constellation mapping/demapping functionality. In some implementations, encoding/decoding circuitry of the baseband circuitry 604 can include convolution, tail-biting convolution, turbo, Viterbi, or Low Density Parity Check (LDPC) encoder/decoder functionality. Implementations of modulation/demodulation and encoder/decoder functionality are not limited to these examples and can include other suitable functionality in other implementations.

In some implementations, the baseband circuitry 604 can include one or more audio digital signal processor(s) (DSP) 604F. The audio DSP(s) 604F can include elements for compression/decompression and echo cancellation and can include other suitable processing elements in other implementations. Components of the baseband circuitry can be suitably combined in a single chip, a single chipset, or disposed on a same circuit board in some implementations. In some implementations, some or all of the constituent components of the baseband circuitry 604 and the application circuitry 602 can be implemented together such as, for example, on a system on a chip (SOC).

In some implementations, the baseband circuitry 604 can provide for communication compatible with one or more radio technologies. For example, in some implementations, the baseband circuitry 604 can support communication with an NG-RAN, an evolved universal terrestrial radio access network (EUTRAN) or other wireless metropolitan area networks (WMAN), a wireless local area network (WLAN), a wireless personal area network (WPAN), etc. Implementations in which the baseband circuitry 604 is configured to support radio communications of more than one wireless protocol can be referred to as multi-mode baseband circuitry.

RF circuitry 606 can enable communication with wireless networks using modulated electromagnetic radiation through a non-solid medium. In various implementations, the RF circuitry 606 can include switches, filters, amplifiers, etc., to facilitate communication with the wireless network. RF circuitry 606 can include a receive signal path which can include circuitry to down-convert RF signals received from the FEM circuitry 608 and provide baseband signals to the baseband circuitry 604. RF circuitry 606 can also include a transmit signal path which can include circuitry to up-convert baseband signals provided by the baseband circuitry 604 and provide RF output signals to the FEM circuitry 608 for transmission.

In some implementations, the receive signal path of the RF circuitry 606 can include mixer circuitry 606a, amplifier circuitry 606b, and filter circuitry 606c. In some implementations, the transmit signal path of the RF circuitry 606 can include filter circuitry 606c and mixer circuitry 606a. RF circuitry 606 can also include synthesizer circuitry 606d for synthesizing a frequency for use by the mixer circuitry 606a of the receive signal path and the transmit signal path. In some implementations, the mixer circuitry 606a of the receive signal path can be configured to down-convert RF signals received from the FEM circuitry 608 based on the synthesized frequency provided by synthesizer circuitry 606d. The amplifier circuitry 606b can be configured to amplify the down-converted signals, and the filter circuitry 606c can be a low-pass filter (LPF) or fband-pass filter (BPF) configured to remove unwanted signals from the down-converted signals to generate output baseband signals. Output baseband signals can be provided to the baseband circuitry 604 for further processing. In some implementations, the output baseband signals can be zero-frequency baseband signals, although this is not a requirement. In some implementations, mixer circuitry 606a of the receive signal path can comprise passive mixers, although the scope of the implementations is not limited in this respect.

In some implementations, the mixer circuitry 606a of the transmit signal path can be configured to up-convert input baseband signals based on the synthesized frequency provided by the synthesizer circuitry 606d to generate RF output signals for the FEM circuitry 608. The baseband signals can be provided by the baseband circuitry 604 and can be filtered by filter circuitry 606c.

In some implementations, the mixer circuitry 606a of the receive signal path and the mixer circuitry 606a of the transmit signal path can include two or more mixers and can be arranged for quadrature downconversion and upconversion, respectively. In some implementations, the mixer circuitry 606a of the receive signal path and the mixer circuitry 606a of the transmit signal path can include two or more mixers and can be arranged for image rejection (e.g., Hartley image rejection). In some implementations, the mixer circuitry 606a of the receive signal path and the mixer circuitry 606a can be arranged for direct downconversion and direct upconversion, respectively. In some implementations, the mixer circuitry 606a of the receive signal path and the mixer circuitry 606a of the transmit signal path can be configured for super-heterodyne operation.

In some implementations, the output baseband signals and the input baseband signals can be analog baseband signals, although the scope of the implementations is not limited in this respect. In some alternate implementations, the output baseband signals and the input baseband signals can be digital baseband signals. In these alternate implementations, the RF circuitry 606 can include analog-to-digital converter (ADC) and digital-to-analog converter (DAC) circuitry, and the baseband circuitry 604 can include a digital baseband interface to communicate with the RF circuitry 606.

In some dual-mode implementations, a separate radio IC circuitry can be provided for processing signals for each spectrum, although the scope of the implementations is not limited in this respect.

In some implementations, the synthesizer circuitry 606d can be a fractional-N synthesizer or a fractional N/N+1 synthesizer, although the scope of the implementations is not limited in this respect as other types of frequency synthesizers can be suitable. For example, synthesizer circuitry 606d can be a delta-sigma synthesizer, a frequency multiplier, or a synthesizer comprising a phase-locked loop with a frequency divider.

The synthesizer circuitry 606d can be configured to synthesize an output frequency for use by the mixer circuitry 606a of the RF circuitry 606 based on a frequency input and a divider control input. In some implementations, the synthesizer circuitry 606d can be a fractional N/N+1 synthesizer.

In some implementations, frequency input can be provided by a voltage-controlled oscillator (VCO), although that is not a requirement. Divider control input can be provided by either the baseband circuitry 604 or the application circuitry 602, depending on the desired output frequency. In some implementations, a divider control input (e.g., N) can be determined from a look-up table based on a channel indicated by the application circuitry 602.

Synthesizer circuitry 606d of the RF circuitry 606 can include a divider, a delay-locked loop (DLL), a multiplexer, and a phase accumulator. In some implementations, the divider can be a dual modulus divider (DMD), and the phase accumulator can be a digital phase accumulator (DPA). In some implementations, the DMD can be configured to divide the input signal by either N or N+1 (e.g., based on a carry out) to provide a fractional division ratio. In some example implementations, the DLL can include a set of cascaded, tunable, delay elements, a phase detector, a charge pump, and a D-type flip-flop. In these implementations, the delay elements can be configured to break a VCO period up into Nd equal packets of phase, where Nd is the number of delay elements in the delay line. In this way, the DLL provides negative feedback to help ensure that the total delay through the delay line is one VCO cycle.

In some implementations, synthesizer circuitry 606d can be configured to generate a carrier frequency as the output frequency, while in other implementations, the output frequency can be a multiple of the carrier frequency (e.g., twice the carrier frequency, four times the carrier frequency) and used in conjunction with quadrature generator and divider circuitry to generate multiple signals at the carrier frequency with multiple different phases with respect to each other. In some implementations, the output frequency can be a LO frequency (fLO). In some implementations, the RF circuitry 606 can include an IQ/polar converter.

FEM circuitry 608 can include a receive signal path which can include circuitry configured to operate on RF signals received from one or more antennas 56, amplify the received signals and provide the amplified versions of the received signals to the RF circuitry 606 for further processing. FEM circuitry 608 can also include a transmit signal path which can include circuitry configured to amplify signals for transmission provided by the RF circuitry 606 for transmission by one or more of the one or more antennas 56. In various implementations, the amplification through the transmit or receive signal paths can be done solely in the RF circuitry 606, solely in the FEM circuitry 608, or in both the RF circuitry 606 and the FEM circuitry 608.

In some implementations, the FEM circuitry 608 can include a TX/RX switch to switch between transmit mode and receive mode operation. The FEM circuitry can include a receive signal path and a transmit signal path. The receive signal path of the FEM circuitry can include an LNA to amplify received RF signals and provide the amplified received RF signals as an output (e.g., to the RF circuitry 606). The transmit signal path of the FEM circuitry 608 can include a power amplifier (PA) to amplify input RF signals (e.g., provided by RF circuitry 606), and one or more filters to generate RF signals for subsequent transmission (e.g., by one or more of the one or more antennas 56).

In some implementations, the PMC 612 can manage power provided to the baseband circuitry 604. In particular, the PMC 612 can control power-source selection, voltage scaling, battery charging, or DC-to-DC conversion. The PMC 612 can often be included when the device 600 is capable of being powered by a battery, for example, when the device is included in a UE. The PMC 612 can increase the power conversion efficiency while providing desirable implementation size and heat dissipation characteristics.

While FIG. 6 shows the PMC 612 coupled only with the baseband circuitry 604. However, in other implementations, the PMC 612 may be additionally or alternatively coupled with, and perform similar power management operations for, other components such as, but not limited to, application circuitry 602, RF circuitry 606, or FEM circuitry 608.

In some implementations, the PMC 612 can control, or otherwise be part of, various power saving mechanisms of the device 600. For example, if the device 600 is in an RRC_Connected state, where it is still connected to the RAN node as it expects to receive traffic shortly, then it can enter a state known as Discontinuous Reception Mode (DRX) after a period of inactivity. During this state, the device 600 can power down for brief intervals of time and thus save power.

If there is no data traffic activity for an extended period of time, then the device 600 can transition off to an RRC_Idle state, where it disconnects from the network and does not perform operations such as channel quality feedback, handover, etc. The device 600 goes into a very low power state and it performs paging where again it periodically wakes up to listen to the network and then powers down again. The device 600 may not receive data in this state; in order to receive data, it can transition back to RRC_Connected state.

An additional power saving mode can allow a device to be unavailable to the network for periods longer than a paging interval (ranging from seconds to a few hours). During this time, the device is totally unreachable to the network and can power down completely. Any data sent during this time incurs a large delay and it is assumed the delay is acceptable.

Processors of the application circuitry 602 and processors of the baseband circuitry 604 can be used to execute elements of one or more instances of a protocol stack. For example, processors of the baseband circuitry 604, alone or in combination, can be used execute Layer 3, Layer 2, or Layer 1 functionality, while processors of the baseband circuitry 604 can utilize data (e.g., packet data) received from these layers and further execute Layer 4 functionality (e.g., transmission communication protocol (TCP) and user datagram protocol (UDP) layers). As referred to herein, Layer 3 can comprise a radio resource control (RRC) layer, described in further detail below. As referred to herein, Layer 2 can comprise a medium access control (MAC) layer, a radio link control (RLC) layer, and a packet data convergence protocol (PDCP) layer, described in further detail below. As referred to herein, Layer 1 can comprise a physical (PHY) layer of a UE/RAN node, described in further detail below.

Figure 7:
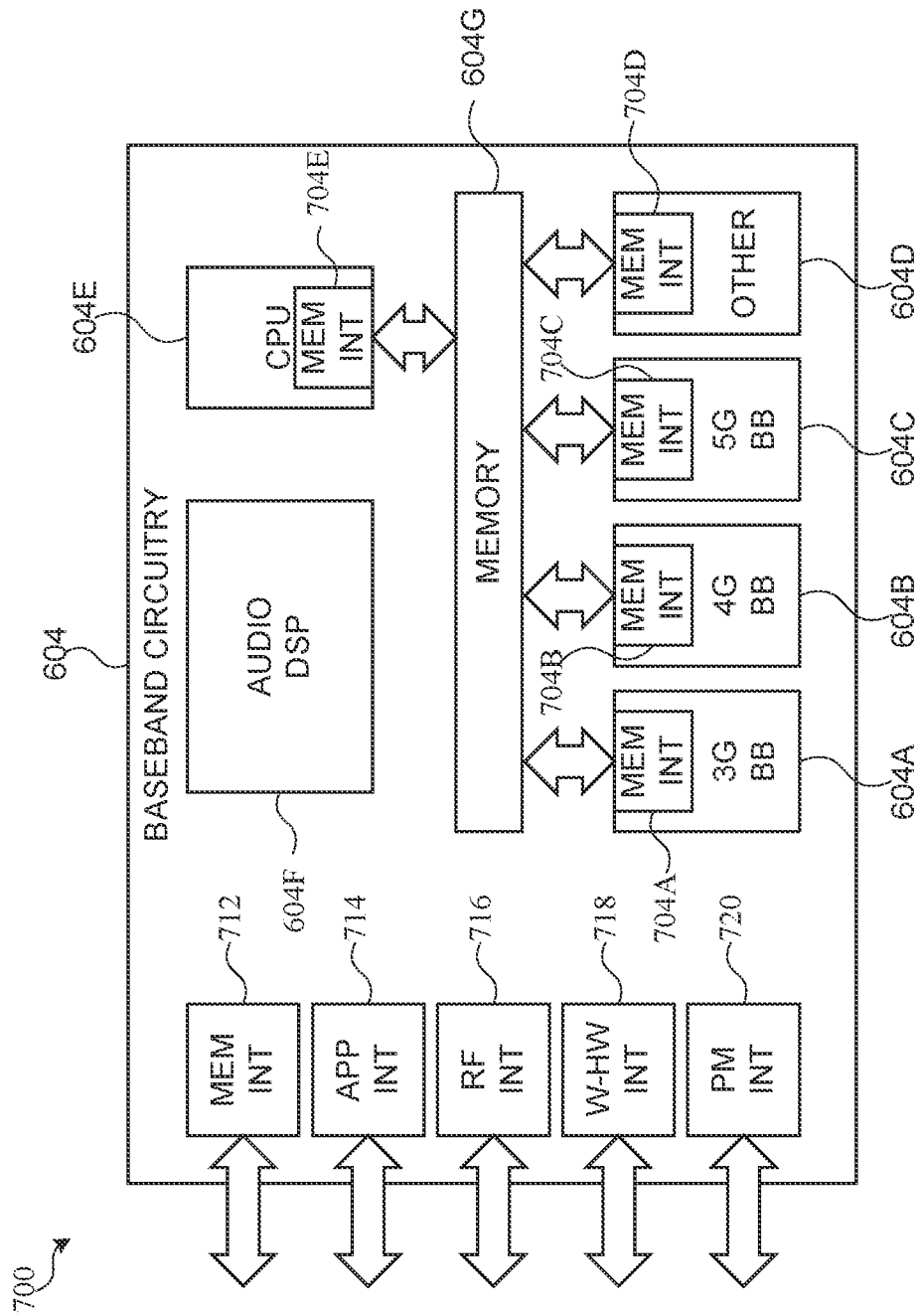
FIG. 7 illustrates a diagram illustrating example interfaces of baseband circuitry that can be employed in accordance with some aspects.

FIG. 7 illustrates a diagram illustrating example interfaces of baseband circuitry that can be employed in accordance with some aspects. As discussed above, the baseband circuitry 604 of FIG. 6 can comprise processors 604A-604E and a memory 604G utilized by said processors. Each of the processors 604A-604E can include a memory interface, 704A-704E, respectively, to send/receive data to/from the memory 604G.

The baseband circuitry 604 can further include one or more interfaces to communicatively couple to other circuitries/devices, such as a memory interface 712 (e.g., an interface to send/receive data to/from memory external to the baseband circuitry 604), an application circuitry interface 714 (e.g., an interface to send/receive data to/from the application circuitry 602 of FIG. 6), an RF circuitry interface 716 (e.g., an interface to send/receive data to/from RF circuitry 606 of FIG. 6), a wireless hardware connectivity interface 718, and a power management interface 720 (e.g., an interface to send/receive power or control signals to/from the PMC 612).

While the methods described within this disclosure are illustrated in and described herein as a series of acts or events, it will be appreciated that the illustrated ordering of such acts or events are not to be interpreted in a limiting sense. For example, some acts can occur in different orders and/or concurrently with other acts or events apart from those illustrated and/or described herein. In addition, not all illustrated acts can be required to implement one or more aspects or aspects of the description herein. Further, one or more of the acts depicted herein can be carried out in one or more separate acts and/or phases. Reference can be made to the figures described above for ease of description. However, the methods are not limited to any particular aspect, aspect or example provided within this disclosure and can be applied to any of the systems/devices/components disclosed herein.

It is well understood that the use of personally identifiable information should follow privacy policies and practices that are generally recognized as meeting or exceeding industry or governmental requirements for maintaining the privacy of users. In particular, personally identifiable information data should be managed and handled so as to minimize risks of unintentional or unauthorized access or use, and the nature of authorized use should be clearly indicated to users.

As it is employed in the subject specification, the term "processor" can refer to substantially any computing processing unit or device including, but not limited to including, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit, a digital signal processor, a field programmable gate array, a programmable logic controller, a complex programmable logic device, a discrete gate or transistor logic, discrete hardware components, or any combination thereof designed to perform the functions and/or processes described herein. Processors can exploit nano-scale architectures such as, but not limited to, molecular and quantum-dot based transistors, switches and gates, in order to optimize space usage or enhance performance of mobile devices. A processor can also be implemented as a combination of computing processing units.

ADDITIONAL EXAMPLES

Examples herein can include subject matter such as a method, means for performing acts or blocks of the method, at least one machine-readable medium including executable instructions that, when performed by a machine (e.g., a processor (e.g., processor, etc.) with memory, an application-specific integrated circuit (ASIC), a field programmable gate array (FPGA), or the like) cause the machine to perform acts of the method or of an apparatus or system for concurrent communication using multiple communication technologies according to aspects and examples described.

Example 1 is a baseband processor of a user equipment (UE), the baseband processor configured to perform operations comprising establishing a Quality-of-Service (QoS) flow with a core network (CN) for a data flow of an application, creating a UE-requested packet flow description (PFD) upon a change in the data flow, sending a request to the CN for updating a CN PFD to an updated PFD using the UE-requested PFD, and receiving a downlink (DL) packet mapped to the QoS flow using the updated PFD.

Example 2 comprises the subject matter of any variation of any of example(s) 1, wherein the DL packet is received with a differentiated services code point (DSCP) mark derived from the updated PFD, and wherein an uplink (UL) packet is transmitted to the CN mapped to the QoS flow based on the DSCP mark.

Example 3 comprises the subject matter of any variation of any of example(s) 2, wherein the DSCP mark is provided by the UE-requested PFD.

Example 4 comprises the subject matter of any variation of any of example(s) 2 or 3, wherein the UL packet is mapped to a plurality of QoS flows using a plurality of updated PFDs.

Example 5 comprises the subject matter of any variation of any of example(s) 2, 3, or 4, further comprising updating a QoS rule based on the DSCP mark after receiving the DL packet, wherein the UL packet is mapped to the QoS flow using the updated QoS rule.

Example 6 comprises the subject matter of any variation of any of example(s) 1, wherein the DL packet is received with a reflective QoS indicator (RQI) setting derived from the updated PFD, and wherein an uplink (UL) packet is transmitted to the CN mapped to the QoS flow based on the derived RQI setting Example 7 comprises the subject matter of any variation of any of example(s) 1-6, wherein the request uses hypertext transfer protocol (HTTP) as a transport layer protocol.

Example 8 comprises the subject matter of any variation of any of example(s) 1-7, wherein the request is sent to a network exposure function (NEF) of the CN via a N33 reference point.

Example 9 comprises the subject matter of any variation of any of example(s) 1-8, wherein the change in the data flow is notified by the application from API.

Example 10 comprises the subject matter of any variation of any of example(s) 1-8, wherein the change in the data flow is identified by the UE.

Example 11 is a network entity, the network entity configured to perform operations comprising establishing a Quality-of-Service (QoS) flow with a user equipment (UE) for a data flow of an application, receiving a request at a network exposure function (NEF) from the UE requesting an update of a core network (CN) packet flow description (PFD) upon a change in the data flow, the request comprising a UE-requested PFD, distributing the UE-requested PFD from the NEF to a user plane function (UPF), determining whether to accept the UE-requested PFD and updating the CN PFD to an updated PFD using the UE-requested PFD if the UE-requested PFD is accepted, transmitting a downlink (DL) packet with a differentiated services code point (DSCP) if there are multiple QoS flows in the UE-requested PFD or a reflective QoS indicator (RQI) setting if there is a single QoS flow in the UE-requested PFD, and receiving an uplink (UL) packet mapped to the QoS flow using an updated PFD, the updated PFD based on the DSCP or RQI setting.

Example 12 comprises the subject matter of any variation of any of example(s) 11, wherein distributing the UE-requested PFD from the NEF to the UPF comprises distributing the UE-requested PFD from the NEF to a session management function (SMF), and distributing the UE-requested PFD from the SMF to the UPF.

Example 13 comprises the subject matter of any variation of any of example(s) 11 or 12, wherein the request is received at the NEF through a N33 reference point.

Example 14 comprises the subject matter of any variation of any of example(s) 11-13, wherein the request uses hypertext transfer protocol (HTTP) as a transport layer protocol.

Example 15 comprises the subject matter of any variation of any of example(s) 11-14, wherein the UL packet is mapped to a plurality of QoS flows using a plurality of updated PFDs.

Example 16 is a method for packet flow description (PFD) management, the method comprising establishing a first Quality-of-Service (QoS) flow between a user equipment (UE) and a core network (CN) within a protocol data unit (PDU) session upon creation of a first data flow by a first application creating, by the UE, a first UE-requested packet flow description (PFD) upon a change in the first data flow, the first UE-requested PFD comprising updating information, sending a request from the UE to network exposure function (NEF) of the CN for an update of a CN PFD, the request comprising the first UE-requested PFD, distributing the first UE-requested PFD from the NEF to a user plane function (UPF), receiving, by the UE from the CN, a downlink (DL) packet with a differentiated services code point (DSCP) or a reflective QoS indicator (RQI) setting, updating a QoS rule of the UE based on the DSCP or the RQI setting, and transmitting, from the UE to the CN, an uplink (UL) packet mapped to the first QoS flow using a first updated PFD, the first updated PFD is created based on the DSCP or RQI setting.

Example 17 comprises the subject matter of any variation of any of example(s) 16, further comprising establishing a second QoS flow between the UE and the CN within the PDU session upon creation of a second data flow by a second application, creating, by the UE, a second UE-requested PFD upon a change in the second data flow, the second UE-requested PFD comprising updating information, wherein the UL packet maps to the second QoS flow using a second updated PFD, the second updated PFD is created based on the received DSCP.

Example 18 comprises the subject matter of any variation of any of example(s) 17, wherein the request comprises the second UE-requested PFD.

Example 19 comprises the subject matter of any variation of any of example(s) 17 or 18, wherein a QoS profile of the UPF is updated based on the second UE-requested PFD.

Example 20 comprises the subject matter of any variation of any of example(s) 16-19, wherein the request is sent to the NEF through a N33 reference point.

Example 21 is a method to perform packet flow description (PFD) management, comprising establishing a Quality-of-Service (QoS) flow between a UE and a core network (CN) for a data flow of an application, creating, by a UE, a UE-requested PFD upon a change in the data flow, sending, from a UE to the CN a request for updating a CN PFD to an updated PFD using the UE-requested PFD, and receiving, by the UE from the CN, a downlink (DL) packet mapped to the QoS flow using the updated PFD.

Example 22 comprises the subject matter of any variation of any of example(s) 21, wherein the DL packet is received by the UE with a differentiated services code point (DSCP) mark derived from the updated PFD, and wherein an uplink (UL) packet is transmitted to the CN mapped to the QoS flow based on the DSCP mark.

Example 23 comprises the subject matter of any variation of any of example(s) 22, wherein the DSCP mark is provided by the UE-requested PFD.

Example 24 comprises the subject matter of any variation of any of example(s) 22 or 23, wherein the UL packet is mapped to a plurality of QoS flows using a plurality of updated PFDs.

Example 25 comprises the subject matter of any variation of any of example(s) 22, 23, or 24, further comprising updating a QoS rule based on the DSCP mark after receiving the DL packet, wherein the UL packet is mapped to the QoS flow using the updated QoS rule.

Example 26 comprises the subject matter of any variation of any of example(s) 21, wherein the DL packet is received by the UE with a reflective QoS indicator (RQI) setting derived from the updated PFD, and wherein an uplink (UL) packet is transmitted to the CN from the UE mapped to the QoS flow based on the derived RQI setting Example 27 comprises the subject matter of any variation of any of example(s) 21-26, wherein the request uses hypertext transfer protocol (HTTP) as a transport layer protocol.

Example 28 comprises the subject matter of any variation of any of example(s) 21-27, wherein the request is sent by the UE to a network exposure function (NEF) of the CN via a N33 reference point.

Example 29 comprises the subject matter of any variation of any of example(s) 21-28, wherein the change in the data flow is notified by the application from API Example 30 comprises the subject matter of any variation of any of example(s) 21-28, wherein the change in the data flow is identified by the UE.

Example 31 includes a product comprising one or more tangible computer-readable non-transitory storage media comprising computer-executable instructions operable to, when executed by at least one computer processor, enable the at least one processor to perform the method of any one of the Examples above.

What is claimed is:

1. An apparatus for a user equipment (UE), comprising:
a memory storing instructions; and
a processor coupled to the memory, and when executing the instructions stored in the memory, configured to cause the UE to perform operations comprising:
 establishing a Quality-of-Service (QoS) flow with a core network (CN) for a data flow of an application;
 creating a UE-requested packet flow description (PFD) upon a change in the data flow;
 sending a request to the CN for updating a CN PFD to an updated PFD using the UE-requested PFD; and
 receiving a downlink (DL) packet mapped to the QoS flow using the updated PFD.

2. The apparatus of claim 1,
wherein the DL packet is received with a differentiated services code point (DSCP) mark derived from the updated PFD; and
wherein an uplink (UL) packet is transmitted to the CN mapped to the QoS flow based on the DSCP mark.

3. The apparatus of claim 2, wherein the DSCP mark is provided by the UE-requested PFD.

4. The apparatus of claim 2, wherein the UL packet is mapped to a plurality of QoS flows using a plurality of updated PFDs.

5. The apparatus of claim 2, further comprising:
updating a QoS rule based on the DSCP mark after receiving the DL packet, wherein the UL packet is mapped to the QoS flow using the updated QoS rule.

6. The apparatus of claim 1,
wherein the DL packet is received with a reflective QoS indicator (RQI) setting derived from the updated PFD; and
wherein an uplink (UL) packet is transmitted to the CN mapped to the QoS flow based on the derived RQI setting.

7. The apparatus of claim 1, wherein the request uses hypertext transfer protocol (HTTP) as a transport layer protocol.

8. The apparatus of claim 1, wherein the request is sent to a network exposure function (NEF) of the CN via a N33 reference point.

9. The apparatus of claim 1, wherein the change in the data flow is notified by the application from API.

10. The apparatus of claim 1, wherein the change in the data flow is identified by the UE.

11. A method for packet flow description (PFD) management, the method comprising:
establishing a first Quality-of-Service (QoS) flow between a user equipment (UE) and a core network (CN) within a protocol data unit (PDU) session upon creation of a first data flow by a first application;
sending, from the UE to a network exposure function (NEF) of the CN, a request for updating a first CN PFD upon a change in the first data flow, the request comprising a first UE-requested packet flow description (PFD);
receiving, by the UE from the CN, a downlink (DL) packet with a differentiated services code point (DSCP) or a reflective QoS indicator (RQI) setting indicating a first updated PFD based on the first UE-requested PFD; and
transmitting, from the UE to the CN, a first uplink (UL) packet mapped to the first QoS flow using the first updated PFD, wherein the first updated PFD is created based on the DSCP or RQI setting.

12. The method of claim 11, further comprising:
establishing a second QoS flow between the UE and the CN within the PDU session upon creation of a second data flow by a second application; and
transmitting, from the UE to the CN, a second UL packet mapped to the second QoS flow using a second updated PFD, wherein the second updated PFD is created based on the DSCP received with the DL packet.

13. The method of claim 12, wherein the request comprises a second UE-requested PFD, and wherein the second UE-requested PFD is created and transmitted via the request upon a change in the second data flow and used to indicate an update of a second CN PFD to the second updated PFD.

14. The method of claim 13, wherein a QoS profile of a user plane function (UPF) is updated based on the second UE-requested PFD.

15. The method of claim 11, wherein the request is sent to the NEF through a N33 reference point.

* * * * *